Jan. 9, 1968  F. C. DOBLE  3,363,172
INSULATING BUSHING TEST APPARATUS INCLUDING AN INSULATED
TEST TERMINAL HAVING A GUARD ELECTRODE
Filed June 1, 1965  6 Sheets-Sheet 1

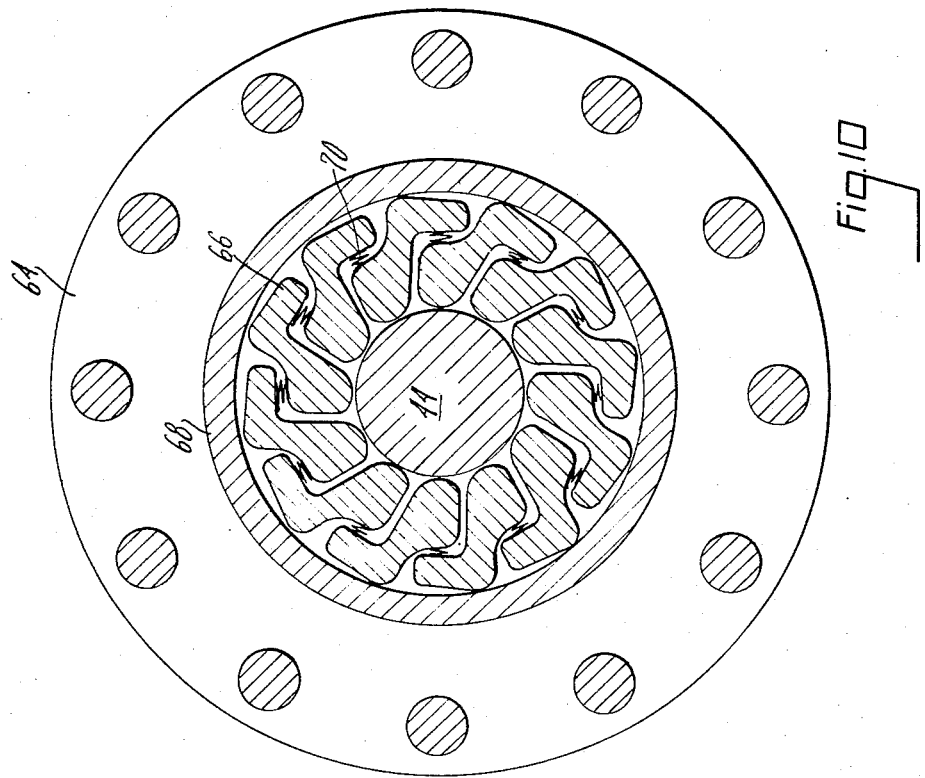
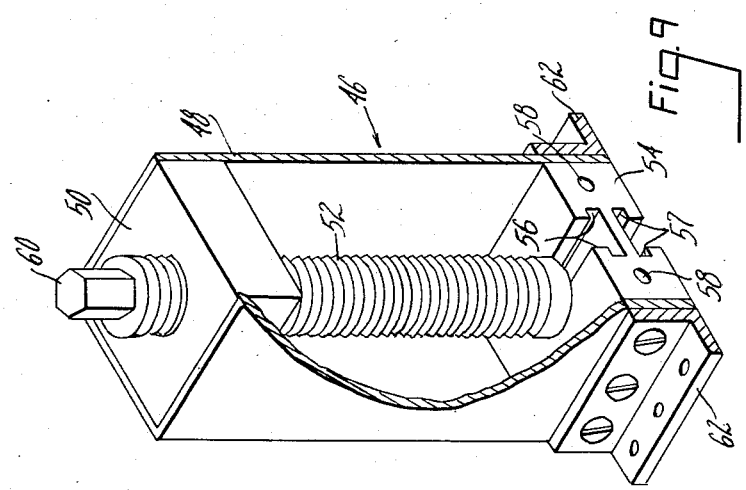

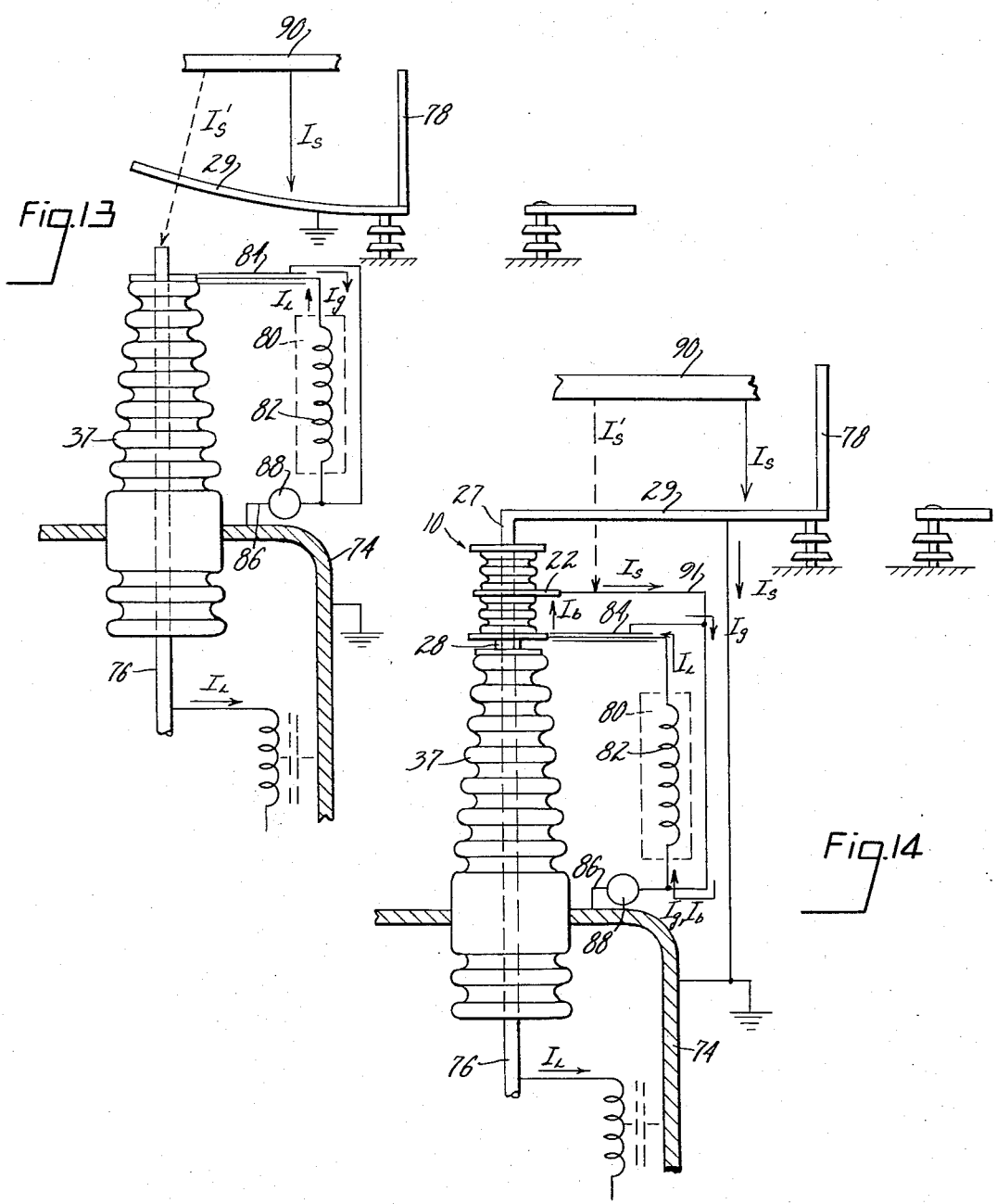

United States Patent Office 3,363,172
Patented Jan. 9, 1968

3,363,172
INSULATING BUSHING TEST APPARATUS IN-
CLUDING AN INSULATED TEST TERMINAL
HAVING A GUARD ELECTRODE
Frank C. Doble, Belmont, Mass., assignor to Doble Engineering Company, Belmont, Mass., a corporation of Massachusetts
Filed June 1, 1965, Ser. No. 460,350
19 Claims. (Cl. 324—54)

ABSTRACT OF THE DISCLOSURE

Apparatus for testing the electrical properties of a high voltage bushing having an insulator surrounding a first electrical conductor with one end thereof adapted for connection to a second conductor. It includes an insulated test terminal having an external removable connector for connecting or disconnecting the conductors. An electrically conductive guard electrode is mounted on the test terminal insulator and is preferably partially recessed within the insulator and preferably extends entirely across it. Testing means are provided for measuring the current flow through the bushing when the test terminal has its connector disconnected. Such testing means includes a transformer having a high voltage winding for providing a test voltage, a high voltage lead for applying the test voltage from such winding to the first conductor, and a return lead including a meter for measuring the current flow caused by the transformer from the conductor through the bushing. Preferably, the testing means also includes a grounded lead for connection to the second conductor during testing of said insulator both for safety and for preventing leakage current from flowing from the test terminal and the second conductor into the meter, as well as a guard lead connected to the guard electrode and to the return lead intermediate the meter and the transformer for reducing interference caused by nearby high voltage sources.

This invention relates to apparatus for facilitating the testing of dielectrics to determine their insulating properties, and, more particularly, to a test terminal for use in conjunction with the high voltage insulating bushings of oil circuit breakers and transformers, stack and suspension type insulators, capacitors, or any other apparatus whose insulating characteristics must be evaluated when the apparatus is installed in the field.

There are many situations in which it is desirable to test the insulation of apparatus in the field, and to do so rapidly to minimize the length of time during which the apparatus being tested must be withdrawn from service and to avoid the expense and delay required to dismantle the apparatus to test it in the laboratory.

The general method for testing such insulation is well known. The apparatus to be tested is electrically isolated from the main power line, usually by opening an air disconnecting switch, and a test voltage is applied to the apparatus at one or more of its bushings. The current flow and watts lost in the insulation are then measured. In Patent No. 1,945,263, issued to Frank C. Doble on Jan. 30, 1934, and Patent No. 2,329,098, issued to Glenn H. Browning and Edmund H. Povey on Sept. 7, 1943, are shown typical examples of apparatus used to obtain such measurements.

One major problem in testing the insulating properties of such apparatus as transformers and oil circuit breakers and their bushings is that the apparatus under test must be electrically isolated from its surroundings. If it is not, the test measurements may be adversely affected by either of: (1) the additional current required to energize the portion of line still attached to the bushing or (2) an extraneous current caused by, for example, electrostatic interference picked up by the connecting lead from nearby high voltage conductors adding its effect to that of the test current.

In the past, it has only been possible to eliminate these effects by mechanically disconnecting the lead from the bushing terminal and supporting it at a distance from the terminal. So long as the insulator is being used with a maximum service voltage of approximately 200 kv., the disassembly process, although time consuming, has made it possible to obtain satisfactory test results. At the present time, however, 345 kv. lines are being used in many power transmission systems, 500 kv. are being installed, and 750 kv. or 1000 kv. lines may be installed in the near future. The great size of the high voltage apparatus used in such high voltage systems makes it difficult mechanically to remove the connecting lead, and to do so would require far too much time and effort. If the lead is not disconnected, not only will the test results be in error, but, in order to test the apparatus, the lead must remain ungrounded. With an ungrounded test lead, there exists the possibility of the lead being accidentally connected to live high voltage with the resulting extreme danger to personnel, which becomes more serious with increased voltage and size of apparatus. Also the possibility of improper reassembly increases under these conditions.

Accordingly, it is a major object of the present invention to provide apparatus by which the connecting lead remains continually supported mechanically while permitting its disconnection from a high voltage bushing without mechanically disassembling the device or other transmission line or bushing elements.

Another major object of the present invention is to provide means for reducing to a substantial degree the effects of extraneous currents caused by electrostatic interference and the like so that the accuracy of the measurement is not seriously affected by such currents.

Still further objects include increasing the safety with which high voltage insulation may be tested by providing means which permit the connecting lead to be grounded during testing.

The invention accomplishes these and other objects by providing a test terminal for utilization in combination with, for example, an axially-extending insulating bushing having a central conductor with a stud at one end thereof normally electrically connected to a power transmission line through a connecting lead.

In accordance with the present invention, its novel test terminal comprises an insulator having upper and lower conducting termination members, with an intermediate guard electrode at least partially recessed within the insulator, together with a removable connector extending between the termination members, all interposed between the stud and the connecting lead. The terminal also includes means for electrically connecting and disconnecting the stud from the power line and for eliminating the effects of leakage over its own insulation system without any change in the mechanical support of the connecting lead.

For a fuller understanding of the nature and objects of the invention, reference is now made to the following detailed disclosure of preferred embodiments thereof taken in conjunction with the accompanying drawings wherein:

FIGS. 6–10 are views of a test terminal embodying an alternative form of the present invention;

Figure 1:
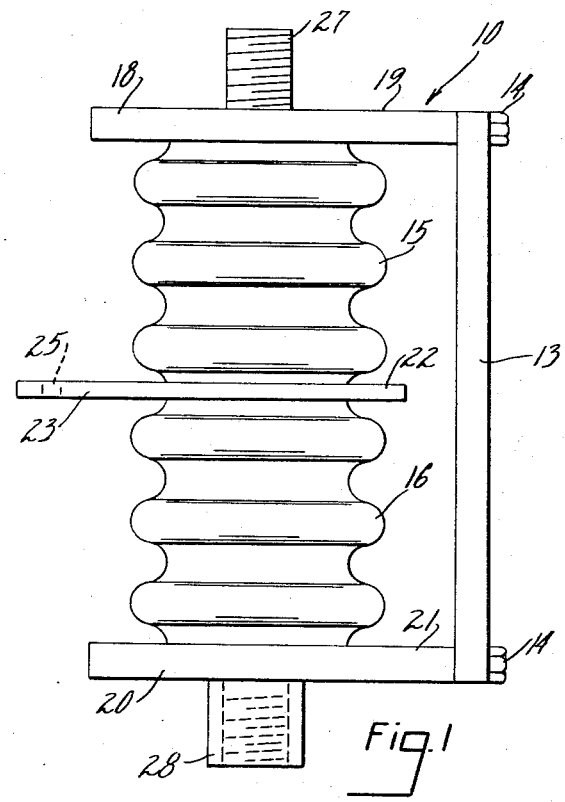
FIGS. 1–3 are, respectively, side and end elevational and plan views of a test terminal embodying one form of the present invention and designed to be installed on the cap of a high voltage bushing.
Figure 2:
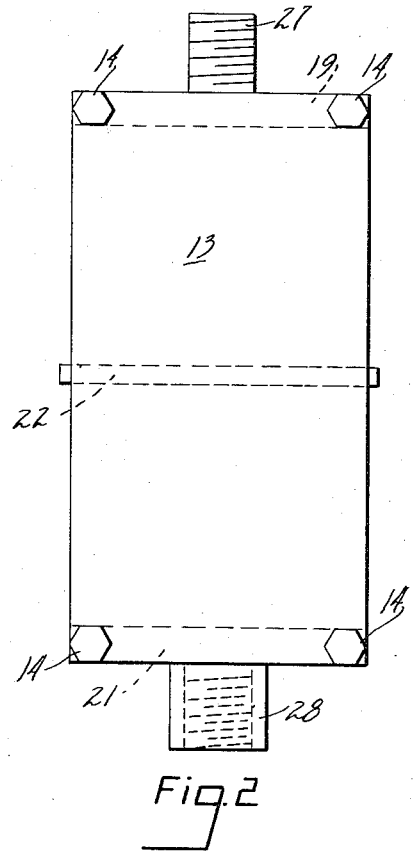
Figure 3:
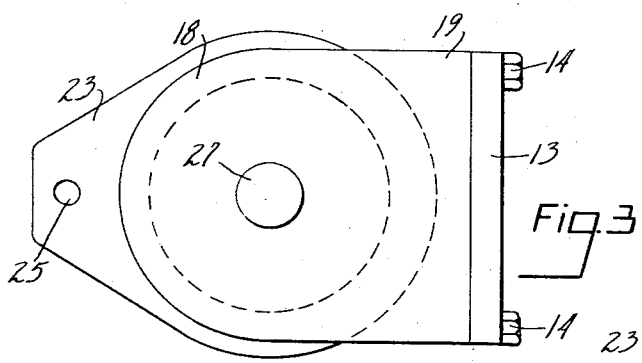
Figure 11:
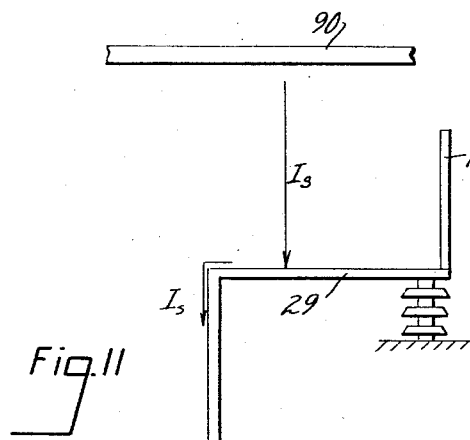
Figure 12:
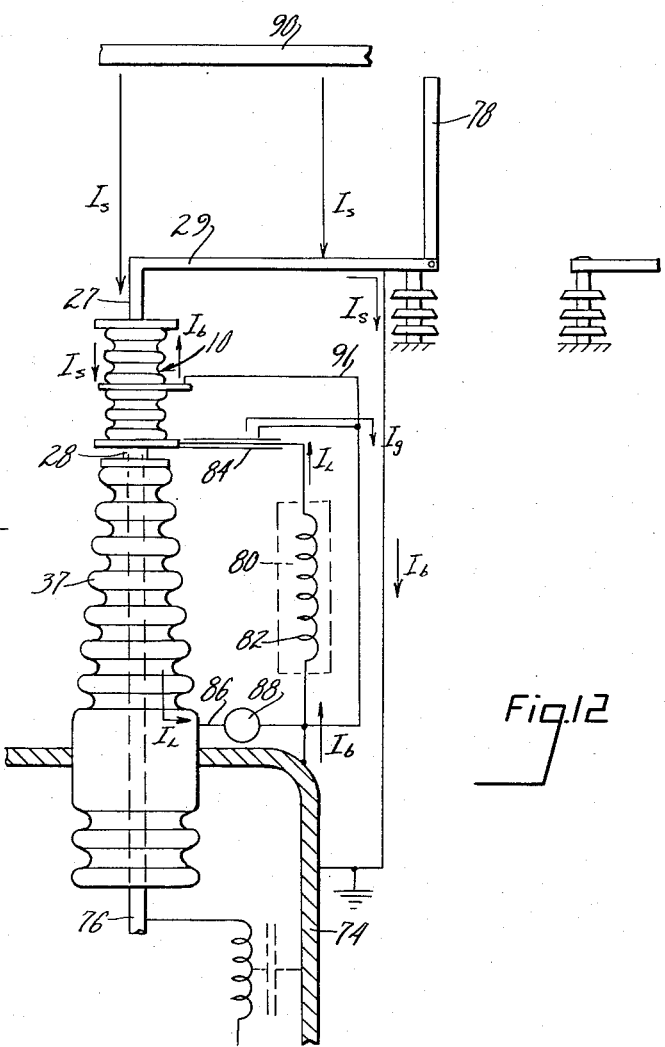

FIGS. 11 and 13 are schematic views of a high voltage bushing and apparatus used for testing the insulation characteristics thereof; and FIGS. 12 and 14 are schematic views of the bushing and test apparatus of FIGS. 11 and 13 respectively including the test terminal of FIGS. 1–3.

Figure 4:
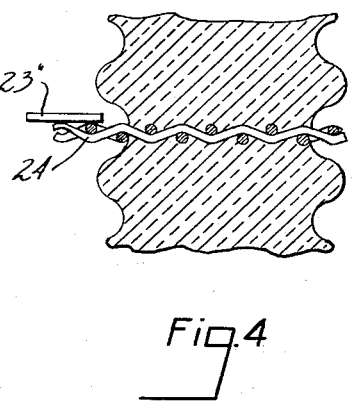
FIGS. 4 and 5 illustrate modifications of the terminal of FIGS. 1–3.
Figure 5:
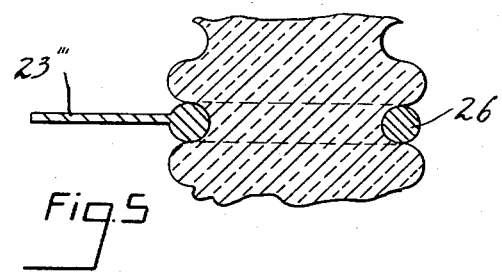

Reference is now made to FIGS. 1–3 wherein is illustrated a test terminal, generally designated 10, embodying the present invention. As shown in FIGS. 1 and 2, test terminal 10 comprises three members in the form of parallel plates, upper current-conducting termination plate 18, lower current-conducting termination plate 20 and intermediate guard electrode 22, held in spaced, face-to-face relationship by a pair of cylindrical insulators 15, 16 spacing and electrically isolating the termination plates and guard electrode from one another. The intermediate guard electrode 22, however, may consist of a solid plate as shown in FIGS. 1–3 or it may consist of a screen or mesh 24 with a tab 23" attached thereto, as shown in FIG. 4, or a ring or a collar 26 encircling the outer surface of the insulator and partially recessed within it and having a tab 23'' as shown in FIG. 5. As shown in FIG. 4, the spacings or openings in such a screen or mesh should preferably be large enough to permit the molding of the insulator in a single unit with the spacings of the conducting elements thereof being sufficiently close to intercept practically all the leakage current. It is important that the insulator be free of electrical connections within the periphery thereof extending from one of the plates to within the periphery of the guard electrode for effective shielding.

Returning to the description of FIGS. 1–3, one insulator 15 thereof is mounted between upper plate 18 and guard electrode 22 and the other insulator 16 is mounted between guard electrode 22 and lower plate 20. A mechanically rigid current conducting connecting member 13 in the form of a plate of substantial cross section and low resistance is removably connected between termination plates 18 and 20 by a series of bolts 14. In the embodiment shown in FIG. 1, termination plates 18 and 20 and guard electrodes 22 comprise substantially planar discs constructed of an electrically conductive material such as copper or aluminum. Termination plates 18 and 20 include radially extending segments 19 and 21, respectively, having tapped bores in their flat end edge surfaces for securing bolts 14. Guard electrode 22 includes a radially extending segment 23 with a hole 25 to facilitate connection to one lead of the testing apparatus, with guard electrodes 24 and 26 being similarly provided with tabs 23'' and 23'''. Test terminal 10 also includes a pair of axially-extending studs and threaded bosses 27 and 28 respectively mounted on termination plates 18, 20, respectively, for connecting the terminal to the connecting lead and insulation bushing.

Reference is now made to FIGS. 6–10 wherein is illustrated a test terminal generally designated 30, embodying an alternative form of the present invention. Test terminal 30 is similar to the test terminal of FIGS. 1, 2 and 3 in that it comprises an upper termination plate 18', a lower termination plate 20', a guard electrode 22', a pair of insulators 15' and 16' for separating and electrically insulating the upper and lower plates from the guard electrode, and means for electrically connecting and disconnecting the upper and lower plates. It differs from test terminal of FIGS. 1, 2 and 3 in that the means for electrically connecting and disconnecting the upper and lower termination plates is provided to permit test terminal 30 to be used in conjunction with insulating bushings which are high off the ground or otherwise inaccessible.

Figure 6:
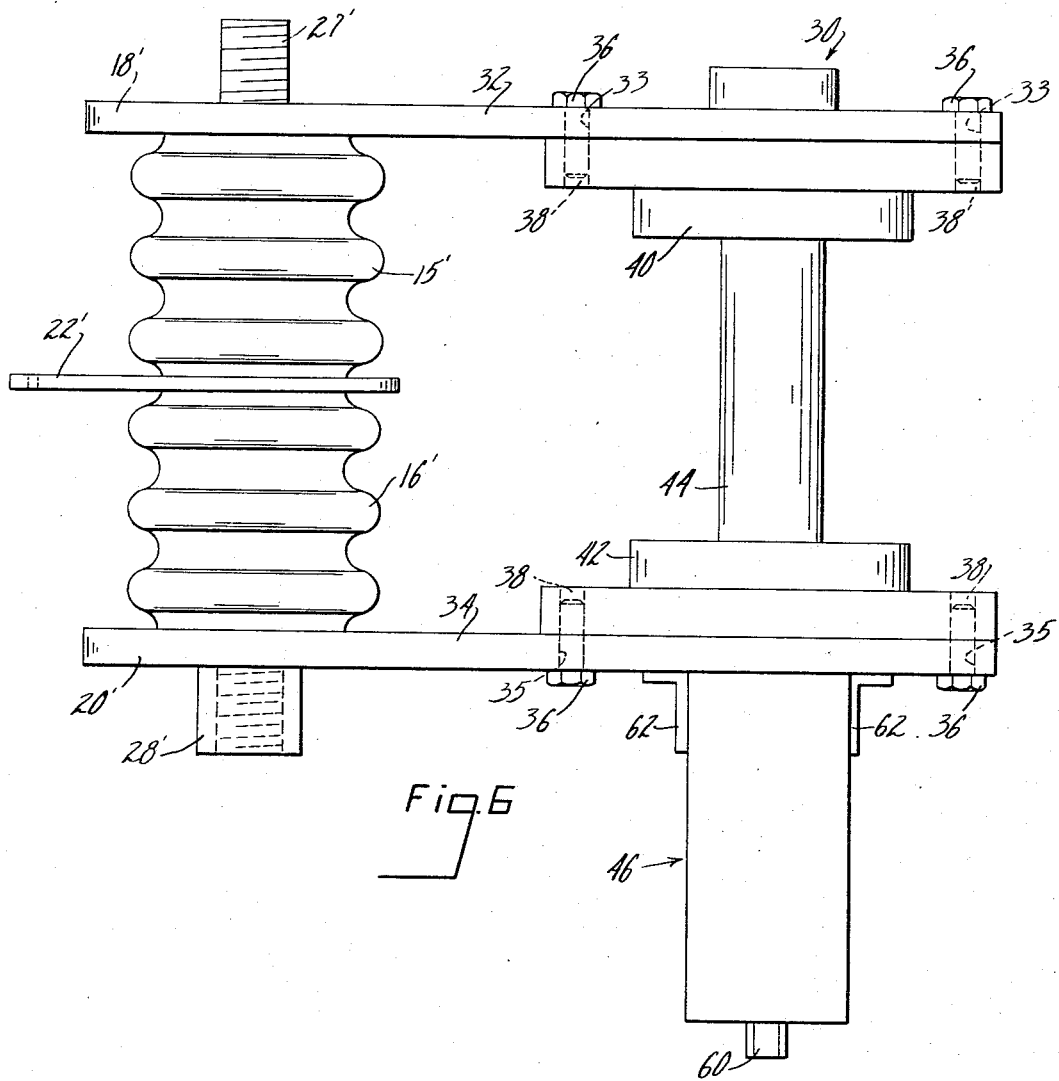
Figure 7:
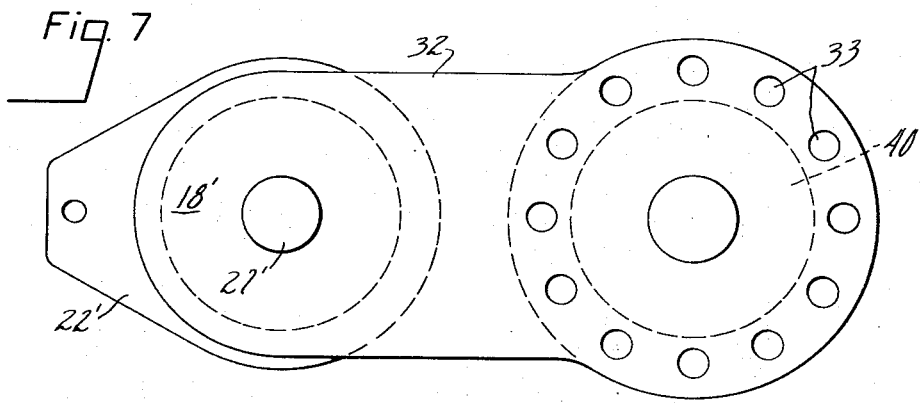

As shown in FIGS. 6 and 7, upper termination plate 18' and lower termination plate 20' have radial extensions 32, 34, respectively, which include a series of bolt holes 33, 35, respectively, for securing by means of bolts 36 a pair of high amperage current connectors 40 and 42 having cooperating threaded bores 38, adjacent to the faces of the upper and lower plates. As shown, connectors 40 and 42 are secured to upper plate extension 32 and lower plate extension 34, respectively, in position for engaging the opposite end portions of a cylindrical copper rod 44. A rod removal device, generally designated 46, is mounted on the lower face of plate extension 34 for advancing rod 44 vertically downwardly from the position shown in FIG. 6 in which it electrically connects termination plates 18' and 20', to the position shown in FIG. 8 in which termination plates 18' and 20' are electrically isolated from one another.

FIG. 9 illustrates rod removal device 46 in more detail. As shown, the device comprises a rectangular tube 48, a threaded rectangular block 50 secured to the bottom of the tube and a vertical screw 52 extending axially through tube 48 and block 50 to a movable rectangular block 54 mounted horizontally for vertical movement within the tube. A pair of L-shaped flanges 62 are mounted on opposite exterior surfaces of tube 48 for mounting the removal device on lower plate extension 34. The end of screw 52 most distant from block 54 comprises a hexagonal nut 60; the other end of screw 52 engages a T-shaped slot 56 in the lower surface of movable block 54. A second T-shaped slot 57 is provided in the upper horizontal surface of block 54 for engaging the lower end of copper rod 44. A plurality of ball bearings 58 are mounted in the vertical sides of block 54 in position for engaging the inner vertical sides of tube 48. Rotating screw 52 moves block 54 to move copper rod 44 vertically relative to and within the tube 48. One major advantage of test terminal 30 is that a man standing many feet below the test terminal may engage and rotate screw 52 using a long-handled wrench, whereas, in order to disconnect member 18 of test terminal 10, of FIGS. 1, 2 and 3, it is necessary for test personnel to have direct, close access to the test terminal.

Figure 8:
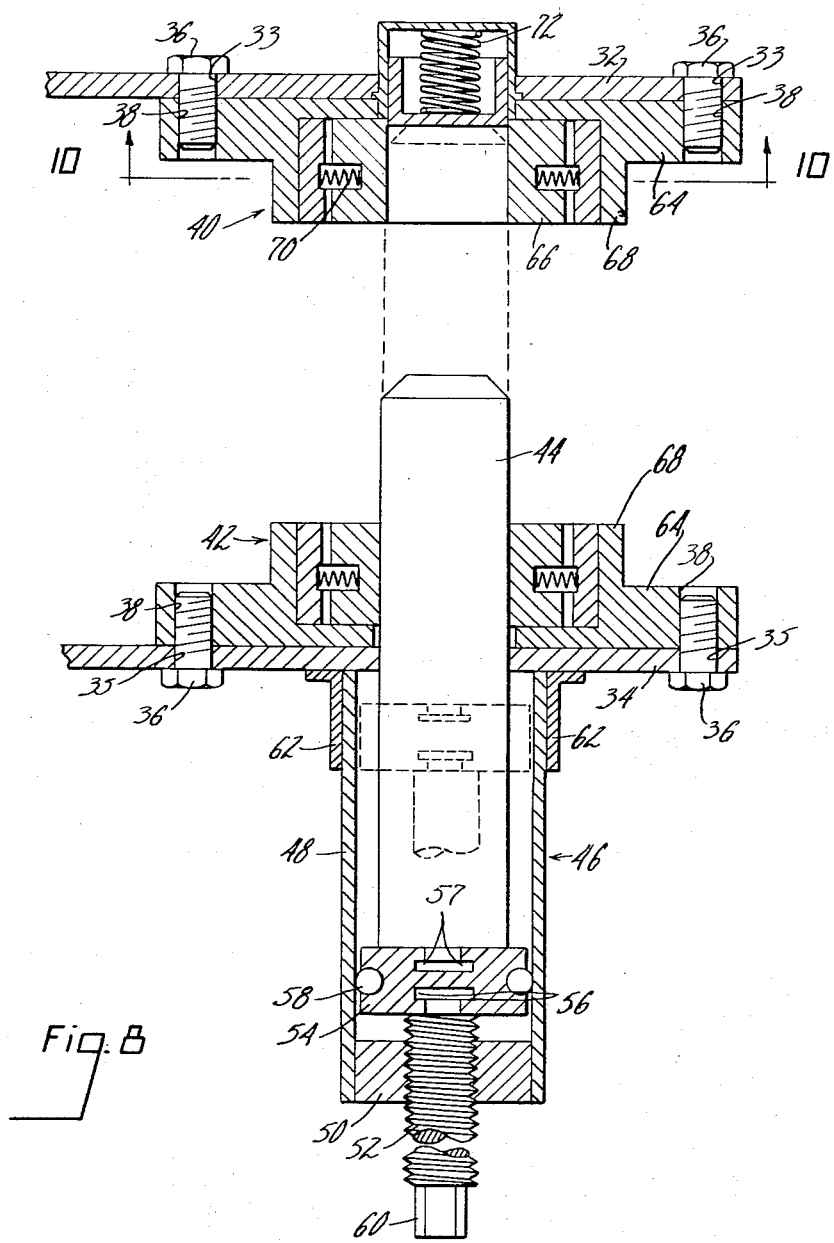

The construction of connectors 40 and 42 is illustrated in FIGS. 8 and 10. Each connector comprises a housing 64 including an upstanding cylindrical flange 68. A plurality of S-shaped shoes 66 are provided within cylindrical flange 68. A portion of each of these shoes is biased toward the central axis of flange 68 by a plurality of springs 70. As illustrated in FIG. 10, shoes 66 are adapted for engaging a portion of the cylindrical outer surface of copper rod 44. The connector 40 mounted on upper plate extension 32 also includes a spring mechanism 72 positioned coaxially with and on the upper side of the connector for engaging the axially-facing end portion of rod 44 when the rod is fully inserted into the connector.

Reference is now made to FIGS. 11–14 which illustrate typical apparatus used for testing the insulation characteristic of an elongated insulation bushing 37 or, for example, a high voltage transformer, or for testing the insulation characteristics of the bushing together with its associated apparatus. Bushing 37 comprises a shell of dielectric material surrounding a rod-like electrical conductor 76 which extends upwardly from the transformer substantially along the axis of the bushing. Conductor 76 terminates adjacent the cap of bushing 37 to form a threaded connector electrically connected to a connecting lead 29 which extends from the transformer to the main power line. A disconnecting switch 78, typically a large knife switch, is provided in lead 29 between the transformer and the main power line.

The illustrated apparatus used for testing the insulation characteristic of the bushing alone or together with its associated apparatus comprises a transformer 80 with a high voltage winding 82 having a shielded lead 84 electrically connected to the cap of bushing 37 and a second lead 86 electrically connected either to the lower portion of bushing 37, when the insulation characteristics of the bushing alone are to be measured as in FIGS. 11 and 12, or to the housing of transformer 74, when the insulation characteristics of both the bushing and transformer are to be measured as in FIGS. 13 and 14. In operation, the high voltage produced by transformer 80 causes a loss current, $I_L$, to flow from lead 84 through the apparatus the insulation characteristics of which are to be evaluated to second lead 86 and then back to the transformer. The magnitude of such current, which represents the current flow and watts loss in the insulation, is measured by an appropriate meter 88 provided in lead 86.

The safety of the crew performing the insulation tests requires that the apparatus being tested be completely isolated from the high voltage power line. Although the long blade of connecting switch 78 makes it possible for the test crew visually to verify that the switch is open, it is highly desirable that the connecting lead be grounded so that if the blade of the disconnecting switch accidentally closes, the high voltage will be short circuited to the ground. If the lead were not grounded, the high voltage from the main power line would be applied to the test apparatus, destroying it and greatly endangering the test crew.

When the insulation characteristics of the bushing alone are being tested (as in FIG. 11), is has not heretofore been possible to ground the connecting lead 29 without removing it since to do so would short circuit the test transformer itself. However, the use of a test terminal constructed according to the present invention makes it uniquely possible to ground the connecting lead without removing its mechanical support, eliminating an otherwise potentially dangerous situation.

Referring to FIG. 12, the test terminal of FIGS. 1, 2 and 3 is shown mounted on the threaded connector of conductor 76 between bushing 37 and connecting lead 29 which is connected to the upper termination plate of the test terminal. The terminal of FIGS. 6 through 10 could be substituted. As shown, the lower plate of test terminal 10, to which shielded lead 84 of transformer 80 is connected, can be electrically isolated from the connecting lead merely by disconnecting or removing the current conducting member connecting the upper and lower termination plates. Once the two plates are so isolated, connecting lead 29 can be grounded without affecting the current flow from the transformer through the insulation bushing.

When the internal insulation of apparatus, such as the oil and coils of a transformer or the draw-rods of a circuit-breaker are to be tested (as in FIG. 13), it is generally necessary to measure all currents which flow to ground through the insulation as there are no taps provided for selective testing. In the past, it has been necessary physically to disconnect the connecting lead from the bushing to insure that the leakage losses and static currents in the connecting lead do not affect the measurement. Although such a procedure is perfectly safe, since the connecting lead can be grounded, removing and reinstalling the connecting lead and any auxiliary connectors requires a great deal of time and effort.

As shown in FIG. 14, however, the use of a test terminal constructed according to the present invention greatly reduces the time required by making it unnecessary physically to remove the connecting lead to provide the required open connection between the bushing and the lead, since whenever the current conducting member connecting the upper and lower termination plates of the test terminal is removed the open connection exists.

In addition to increasing the safety and/or convenience with which insulation tests may be accomplished, test terminals constructed according to the present invention also increase the accuracy of the testing process. As previously mentioned, other high voltage equipment, such as bus bar 90, located in the area adjacent the bushing being tested may cause an interference current which is picked up by the connecting lead or test apparatus, and adds its effect to that of the test voltage. As illustrated in FIGS. 11-14, any such current, $I_s$, picked up by connecting lead 29 goes to ground through the high voltage winding 82 in FIG. 11 and directly to ground in FIG. 13. Any leakage current $I_g$ from shielded lead 84 to its outer shield returns to the low voltage terminal of transformer 80 without passing through meter 88. When the connecting lead can be grounded, for example, by using the test terminal as shown in FIGS. 12 and 14, the interference current $I_s$ will pass directly to ground without affecting the test results. Even with the connecting lead grounded as in FIGS. 13 and 14, the apparatus may pick up some small interference current $I'_s$ which will be measured by the meter 88. This current is usually very small but, if necessary, the error may be eliminated by reversing the test current and averaging the meter readings.

In FIGS. 12 and 14 the high test voltage from the high voltage winding 82 applied to boss 28 sends a leakage current $I_b$ over the insulation of the test terminal which current tends to return to the high voltage winding. In FIG. 12, since the high voltage winding is grounded to the transformer case, the current $I_b$ can return to it through the grounded connecting lead 29, so that lead 91 to the guard electrode 22 need not be used.

In FIG. 14, if the leakage current $I_b$ from the stud 28 went to ground through connecting lead 29, it would return to the high voltage winding through the meter 88 and thus be measured. However, the intermediate electrode 22 intercepts this leakage current $I_b$ and it is conducted through lead 91 back to the high voltage winding 82 without being measured by the meter 88.

FIG. 14 shows the leakage current $I_b$ from the boss 28 intercepted by the intermediate electrode 22 and conducted back to the high voltage winding 82 without being measured by the meter 88. The insulator 15 is usually made of a very high resistivity material such as porcelain so that the leakage current $I_b$ is practically all surface leakage current, particularly in wet weather, the leakage current within the insulator usually being practically negligible. Under such conditions it becomes possible to use a metal ring or collar 26 encircling the insulator and making intimate contact with its surface as shown in FIG. 5, rather than using a metal sheet 22 or a metal screen 24. The ring or collar also may be inserted within the insulation as in a groove or molded within the insulator and exposed to its surface. Even if there are leakage currents within the insulator such as $I_b$, these in large part will be intercepted by the ring 26.

It should also be noted that each horizontal plate of the test terminal will act as an "umbrella" to shield the plates below it and the bushing from interference from nearby high voltage apparatus. Any stray interference currents picked up by the upper termination plate are conducted directly to ground through the connecting lead.

Since certain changes may be made in the above apparatus without departing from the scope of the invention involved, it is intended that all matter contained in the above description or shown in the accompanying drawings shall be interpreted as illustrative and not in a limiting sense. Other embodiments within the scope of the following claims will occur to those skilled in the art.

What is claimed is:

1. A test terminal adapted for interposition between two electrical conductors and operating in a first predetermined mode electrically to connect said conductors and in a second predetermined mode electrically to disconnect said conductors, said terminal comprising:

insulator means of substantial length a first electrically conductive member having means for electrically connecting it to one of said electrical conductors, said first member being secured to one end of said insulator means with a portion extending therebeyond a second electrically conductive member having means for electrically connecting it to the other of said electrical conductors, said second member being secured to the opposite end of said insulator means with a portion extending therebeyond an electrically conductive guard electrode spaced between said first and second conductive members by said insulator means and having a terminal portion extending outwardly beyond said insulator means, said insulator means being free of electrical connections within the periphery thereof extending from one of said members to within the periphery of said guard electrode and spacing and electrically isolating said first and second members and said guard electrode from each other in said second mode;

a mechanically rigid current conducting connector of substantial cross-section and low electrical resistance normally extending between said first and second members in said first mode, said connector being spaced outside the periphery of said insulator means and said guard electrode, and means removably and rigidly attaching said connector to said first and second conductive member portions extending beyond said insulator means providing a low electrical resistance path therebetween in said first mode and for removal thereof to disconnect said members in said second mode.

2. The test terminal of claim 1 in which said guard electrode is at least partially recessed within said insulator means.

3. The test terminal of claim 1 in which said guard electrode is a perforate member.

4. The test terminal of claim 1 in which said first and second members and said guard electrode comprise substantially planar elements mounted in parallel spaced face-to-face relationship.

5. The test terminal of claim 1 in which said first and second members comprise substantially parallel planar elements and said guard electrode comprises an open mesh member mounted in parallel spaced face-to-face relationship with said planar elements.

6. The test terminal of claim 1 in which said first and second members comprise substantially planar elements mounted in parallel spaced face-to-face relationship and said guard electrode comprising a metallic ring or collar in intimate contact with the surface of said insulating means, the plane of said ring or collar being in parallel relationship to said first and second members.

7. The test terminal of claim 1 in which said current conducting member comprises a substantially cylindrical rod removably secured to said first and second members for axial movement relative thereto by first and second current connectors mounted, respectively, on said first and second members in position for engaging said rod.

8. In combination with the test terminal of claim 7, rod advancement means secured to one of said first and second members in position for engaging said rod and advancing said rod axially relative to said members, said rod advancement means including a cylindrical threaded member mounted in substantial axial alignment with said rod for advancing said rod in response to the rotation of said threaded member.

9. A test terminal adapted for interposition between two electrical conductors and operating in a first predetermined mode electrically to connect said conductors and in a second predetermined mode electrically to disconnect said conductors, said terminal comprising:

generally cylindrical insulator means of substantial length having a central axis a first electrically conductive plate having means for electrically connecting it to one of said electrical conductors, said first plate being secured to one end of said insulator means with a portion extending therebeyond in a direction prependicular to the axis of said insulator terminating in a flat edge surface parallel to said axis, a second electrically conductive plate having means for electrically connecting it to the other of said electrical conductors, said second plate being secured to the opposite end of said insulator means with a portion extending therebeyond in a direction perpendicular to the axis of said insulator terminating in a flat edge surface parallel to said axis, an electrically conductive guard electrode spaced between said first and second conductive plates by said insulator means and extending across said insulator means generally throughout the cross section thereof and having a terminal portion extending outwardly beyond said insulator means, said insulator means being free of electrical connections within the periphery thereof extending from one of said plates to within the periphery of said guard electrode and spacing and electrically isolating said first and second plates and said guard electrode from each other in said second mode;

a mechanically rigid current conducting connector of substantial cross-section and low electrical resistance normally extending between said first and second plate flat edge surfaces in said first mode, said connector being spaced outside the periphery of said insulator means and said guard electrode, and a plurality of bolts removably attaching said connector to said first and second plate flat edge surfaces in pressure contact therewith providing a low electrical resistance path therebetween in said first mode and for removal thereof to disconnect said plates in said second mode.

10. In combination with high voltage apparatus including an axially-extending insulating bushing having a central conductor with a stud at one end thereof adapted for electrical connection to a power transmission line, a test terminal interposed between said stud and said power transmission line operating in a first predetermined mode electrically to connect said stud with said line and in a second predetermined mode electrically to disconnect said stud from said line for testing of said apparatus by electrical connection of a test instrument providing a test voltage to said stud, said terminal comprising:

a first electrically conductive member for mounting on said stud;

a second electrically conductive member for connecting to said power transmission line spaced apart and electrically isolated from said first member;

a current conducting member removably connecting said first and second members;

an electrically conductive guard electrode interposed between said first and second members; and insulating means secured to said guard electrode and said first and second members for spacing and electrically isolating said guard electrode and said first and second members from each other.

11. In combination with high voltage apparatus including an axially-extending insulating bushing having a central conductor with a stud at one end thereof adapted to be electrically connected to a power transmission line, a test terminal interposed between said stud and said power transmission line operating in a first predetermined mode electrically to connect said stud with said line and in a second predetermined mode electrically to disconnect said stud from said line for testing of said apparatus by electrical connection of a test instrument providing a test voltage to said stud, said terminal comprising:

a first electrically conductive member for mounting on said stud substantially perpendicular to the axis of said bushing;

a second electrically conductive member for connecting to said power transmission line mounted parallel in spaced face-to-face relationship with and electrically isolated from said first member;

a current conducting element removably connecting said first and second members;

an electrically conductive guard electrode interposed between said first and second members; and insulating means secured to said guard electrode and said first and second members for spacing and electrically isolating said guard electrode and said first and second members from each other.

12. The test terminal of claim 11 in which said current conducting element comprises a substantially cylindrical rod removably secured to said first and second members for axial movement relative thereto by first and second current connectors mounted, respectively, on said first and second members in position for engaging said rod.

13. In combination with the test terminal of claim 12, rod advancement means secured to one of said first and second members in position for engaging said rod and advancing said rod axially relative to said termination members, said rod advancement means including a cylindrical threaded member mounted in substantial axial alignment with said rod for advancing said rod axially in response to the rotation of said threaded member.

14. In combination with a high voltage apparatus including an insulator surrounding a first electrical conductor having one end thereof adapted for electrical connection to a second electrical conductor, apparatus for testing the electrical properties of said insulator comprising:

a test terminal interposed between said electrical conductors operating in a first predetermined mode electrically to connect said conductors and in a second predetermined mode electrically to disconnect said conductors for testing said insulator, said test terminal including:

a first electrically conductive member for mounting on said one end of said first conductor;

a second electrically conductive member for mounting on said second conductor;

an electrically conductive guard electrode mounted intermediate said first and second members;

a current conducting member removably connecting said first and second members, and insulating means secured to and electrically isolating said guard electrode from said first and second members; and, testing means for measuring the current flow through said insulator when said test terminal is operating in said second predetermined mode, said testing means including transformer means having a high voltage winding for providing a test voltage;

a high voltage lead for applying the test voltage from said winding to said first conductor; and a return lead including a meter for measuring the current flow caused by said transformer from said conductor through said insulator.

15. The apparatus of claim 14 in which said testing means includes a grounded lead for connection to said second conductor during testing of said insulator for safety and for preventing leakage current from flowing from said test terminal and said second conductor into said meter.

16. The apparatus of claim 15 in which said testing means includes a guard lead connected to said guard electrode and to said return lead intermediate said meter and said transformer.

17. The apparatus of claim 16 in which said first and second members and said guard electrode comprise substantially planar discs mounted in spaced face-to-face relationship perpendicular to the axis of said first conductor.

18. The apparatus of claim 17 in which said current conducting member comprises a substantially cylindrical rod removably secured to said first and second members for axial movement relative thereto by first and second current connectors mounted, respectively, on said first and second members in position for engaging said rod.

19. In combination with the terminal of claim 18, rod advancement means secured to one of said first and second members in position for engaging an end portion of said rod and advancing said rod axially relative to said members, said rod advancement means including a cylindrical threaded member mounted in substantial axial alignment with said rod for advancing said rod axially in response to the rotation of said threaded member.

References Cited

UNITED STATES PATENTS

| | | | |
|---|---|---|---|
| 2,239,598 | 4/1941 | Fawcett et al. | 324—54 |
| 2,333,532 | 11/1943 | Frakes et al. | 324—54 |
| 2,402,466 | 6/1946 | Terpak et al. | 324—54 |
| 2,679,026 | 5/1954 | Frakes | 324—54 |
| 3,189,818 | 6/1965 | Frakes | 324—54 |

RUDOLPH V. ROLINEC, *Primary Examiner.*

G. R. STRECKER, *Assistant Examiner.*